United States Patent
Ohata et al.

(10) Patent No.: US 7,435,507 B2
(45) Date of Patent: Oct. 14, 2008

(54) LITHIUM ION SECONDARY BATTERY AND METHOD FOR MANUFACTURING THE SAME

(75) Inventors: Tsumoru Ohata, Kyoto (JP); Shigeo Ikuta, Hirakata (JP); Akiko Fujino, Suita (JP); Tetsuya Hayashi, Kadoma (JP); Kohei Suzuki, Yao (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 681 days.

(21) Appl. No.: 10/973,431

(22) Filed: Oct. 27, 2004

(65) Prior Publication Data

US 2005/0095505 A1    May 5, 2005

(30) Foreign Application Priority Data

Oct. 29, 2003   (JP)   ............................. 2003-368651

(51) Int. Cl.
*H01M 2/18*   (2006.01)
*H01M 2/16*   (2006.01)

(52) U.S. Cl. ..................... 429/94; 429/130; 429/246; 429/251; 29/623.1

(58) Field of Classification Search ................ 429/94, 429/130, 246, 251; 29/623.1
See application file for complete search history.

(56) References Cited

U.S. PATENT DOCUMENTS

| | | | | |
|---|---|---|---|---|
| 3,373,060 | A * | 3/1968 | Gray | ............................ 429/94 |
| 4,709,472 | A * | 12/1987 | Machida et al. | ........... 429/94 X |
| 5,989,743 | A * | 11/1999 | Yamashita | ................ 429/94 X |
| 6,391,488 | B1 * | 5/2002 | Shimizu et al. | ................ 429/94 |
| 6,677,076 | B2 * | 1/2004 | Nakahara et al. | .............. 429/94 |
| 6,677,083 | B2 * | 1/2004 | Suzuki et al. | ........... 429/251 X |

FOREIGN PATENT DOCUMENTS

| | | |
|---|---|---|
| JP | 9-035738 | 2/1997 |
| JP | 10-106530 | 4/1998 |

* cited by examiner

*Primary Examiner*—Stephen J. Kalafut
(74) *Attorney, Agent, or Firm*—McDermott Will & Emery LLP

(57) ABSTRACT

A lithium ion secondary battery has an electrode group including: a winding core; and a positive electrode and a negative electrode that are wound around the winding core. This electrode group does not have an independent separator between the positive and negative electrodes. A porous film is integrally formed on both sides of at least one of the positive electrode and the negative electrode. The negative electrode and the positive electrode are connected to the winding core by a negative electrode resin film and a positive electrode resin film, respectively. The use of such resin films makes it possible to reduce the breakage of the porous films and prevent a short-circuit between the positive and negative electrodes.

6 Claims, 4 Drawing Sheets

F I G. 1
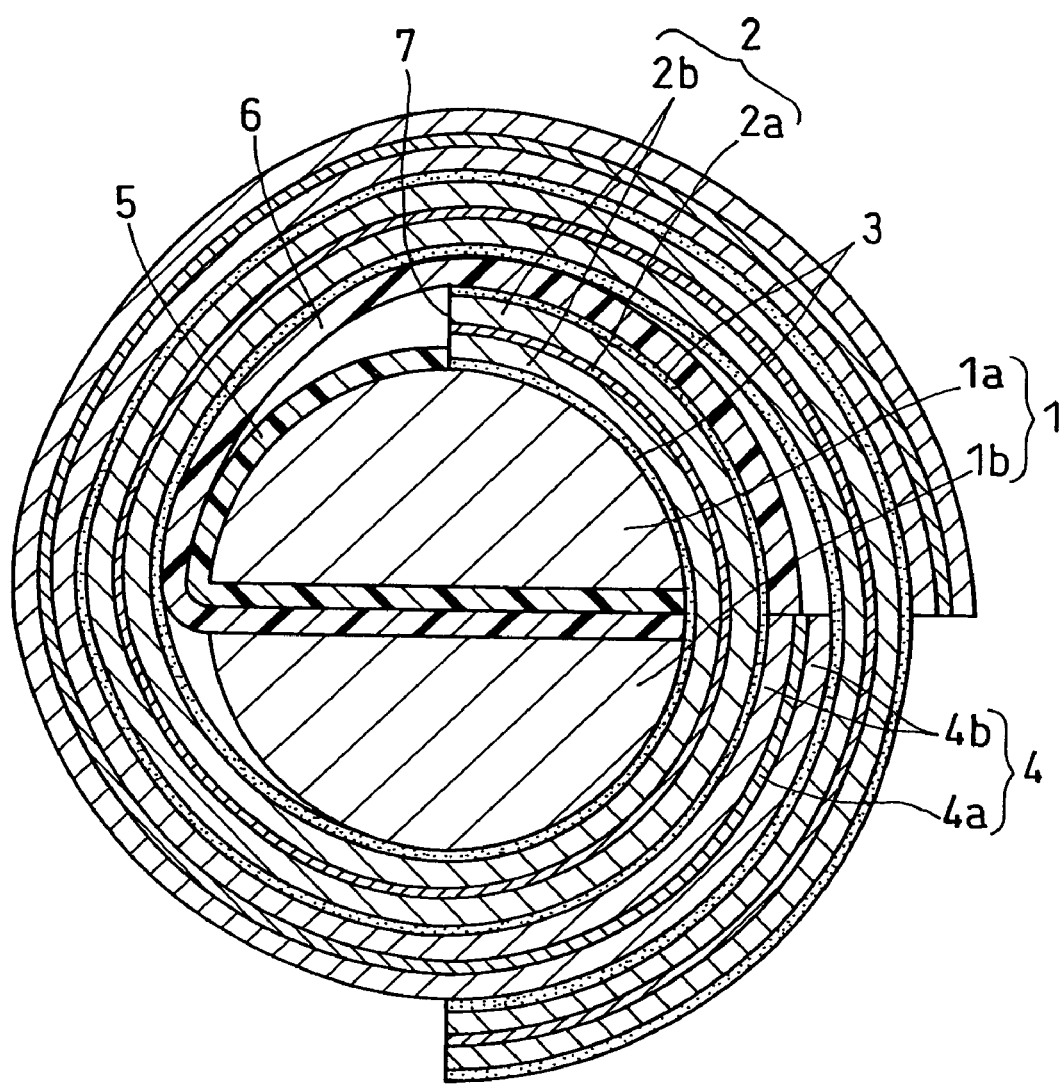

LITHIUM ION SECONDARY BATTERY AND METHOD FOR MANUFACTURING THE SAME

BACKGROUND OF THE INVENTION

The present invention relates to a lithium ion secondary battery and a manufacturing method thereof. More particularly, the present invention relates to the structure of a wound electrode group that does not use an independent separator, and a manufacturing method thereof.

Electrochemical batteries, such as lithium ion secondary batteries, include a separator that is interposed between a positive electrode and a negative electrode. This separator has the function of electrically insulating the positive electrode plate from the negative electrode plate, as well as the function of retaining an electrolyte. A micro-porous thin film sheet, composed mainly of polyethylene, is currently used as the separator in lithium ion secondary batteries.

Further, lithium ion secondary batteries include a wound electrode group which is prepared, for example, by laminating and winding the positive electrode, the negative electrode and the separator. Such an electrode group, wound so as to have an oval cross section, is also used in rectangular batter- Various winding methods have been proposed. For example, Japanese Laid-Open Patent Publication No. Hei 9-35738 proposes using a winding core that is preferable, when the electrode plates are thick, for eliminating the impact of a gap created by the edges of the thick electrode plates at the initial winding position.

Also, for example, Japanese Laid-Open Patent Publication No. Hei 10-106530 proposes forming a porous film, which comprises a filler and a binder, on both sides of at least one of the positive and negative electrodes, instead of the conventional structure of providing a separator between the positive and negative electrodes, in order to improve high-rate characteristics and cycle characteristics (see claim 15 and FIG. 2). Such an electrode group is described below with reference to FIG. 4.

An electrode group of FIG. 4 is composed of a winding core 1, a negative electrode 2, and a positive electrode 4. The winding core 1 consists of an upper winding core 1a and a lower winding core 1b. The negative electrode 2 consists of a negative electrode core material 2a and negative electrode active material layers 2b formed on both sides of the negative electrode core material 2a. Further, a porous film 3, comprising a filler and a binder, is bonded to each of the negative electrode active material layers 2b. The positive electrode 4 consists of a positive electrode core material 4a and positive electrode active material layers 4b formed on both sides of the positive electrode core material 4a.

The core material is exposed at the inner end of the negative electrode 2, and the exposed core material is sandwiched between the upper winding core 1a and the lower winding core 1b. Then, the negative electrode 2 and the positive electrode 4 are wound around the winding core, with the positive electrode 4 between the negative electrode 2, to form a wound electrode group.

In the electrode group of FIG. 4, an independent separator is not provided between the negative and positive electrodes, and the porous film is bonded to both sides of at least one of the positive and negative electrodes. Thus, no separator is necessary, and the structure of the electrode group can be simplified. Further, since the porous films are integrated into the electrode, short-circuits resulting from the displacement of a separator can be suppressed.

However, in such an electrode group, the porous film does not have a structure capable of retaining the strength in the direction parallel to the electrode surface on which the porous film is bonded, unlike an independent separator such as a micro-porous thin film sheet. Therefore, when the positive and negative electrodes are wound to form an electrode group, the porous films may become broken or separated around the inner most turn of the wound electrode group, due to the strain exerted on the wound electrode plates or the gap created by the edges of the electrode plates. In this case, the negative electrode and the positive electrode often come in contact with each other to cause a short-circuit.

In view of the above, an object of the present invention is to provide a lithium ion secondary battery having an electrode group that can reduce the breakage of porous films, and a manufacturing method thereof.

BRIEF SUMMARY OF THE INVENTION

The above-described problems arise because the structure and manufacturing method designed for conventional batteries including an independent separator are also used for batteries in which porous films are integrated into an electrode plate.

In order to solve the above-described problems, the present invention relates to a lithium ion secondary battery comprising an electrode group, the electrode group comprising: (1) a winding core; (2) a positive electrode and a negative electrode that are wound around the winding core; (3) a porous film that is integrally formed on both sides of at least one of the positive electrode and the negative electrode; (4) a positive electrode resin film of which one end is attached to the positive electrode; and (5) a negative electrode resin film of which one end is attached to the negative electrode. This electrode group does not have an independent separator between the positive electrode and the negative electrode. The porous film comprises a filler and a binder. The other end of the positive electrode resin film is connected to the winding core, and the other end of the negative electrode resin film is connected to the winding core. The winding core may be any member to which the resin film can be connected, and for example, may be a member consisting of two parts that can sandwich the resin film. Also, it is preferred that the porous film be integrally formed on both sides of at least one of the positive electrode and the negative electrode.

In the above-mentioned lithium ion secondary battery, it is preferable that the positive electrode and the negative electrode comprise a core material and an active material layer carried on the core material, that the porous film be integrally formed on both sides of the negative electrode, and that the active material layer of the positive electrode and/or the negative electrode be carried on only one side of the core material from the inner end of the positive electrode and/or the negative electrode to a predetermined position.

In the lithium ion secondary battery, it is preferable that one end of the positive electrode or the negative electrode to which the resin film is attached be in contact with the surface of the winding core, and that a recessed part be provided at the part of the winding core which the one end of the positive electrode or the negative electrode is in contact with.

The present invention also relates to a method for manufacturing a lithium ion secondary battery comprising the steps of: (a) forming a positive electrode active material layer on both sides of a positive electrode core material, to obtain a positive electrode; (b) forming a negative electrode active material layer on both sides of a negative electrode core material, to obtain a negative electrode; (c) forming a porous film that comprises a filler and a binder on both sides of the positive electrode and/or the negative electrode; (d) attaching a positive electrode resin film and a negative electrode resin film to one end of the positive electrode and one end of the negative electrode, respectively; and (e) winding the positive electrode and the negative electrode around a winding core, with the positive and negative electrode resin films fixed to the winding core, and without interposing an independent separator between the positive and negative electrodes, to form an electrode group.

In the abovementioned manufacturing method, it is preferable that the active material layer of at least one of the positive electrode and the negative electrode be formed on only one side of the core material from one end of the core material to a predetermined position.

In this manufacturing method, it is preferable that a recessed part be provided in the winding core, and that the one end of the positive electrode or the negative electrode to which the resin film is attached be fitted to the recessed part.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 1 is a schematic cross-sectional view of an electrode group of a lithium ion secondary battery in one embodiment of the present invention.

DETAILED DESCRIPTION OF THE INVENTION

Figure 2:
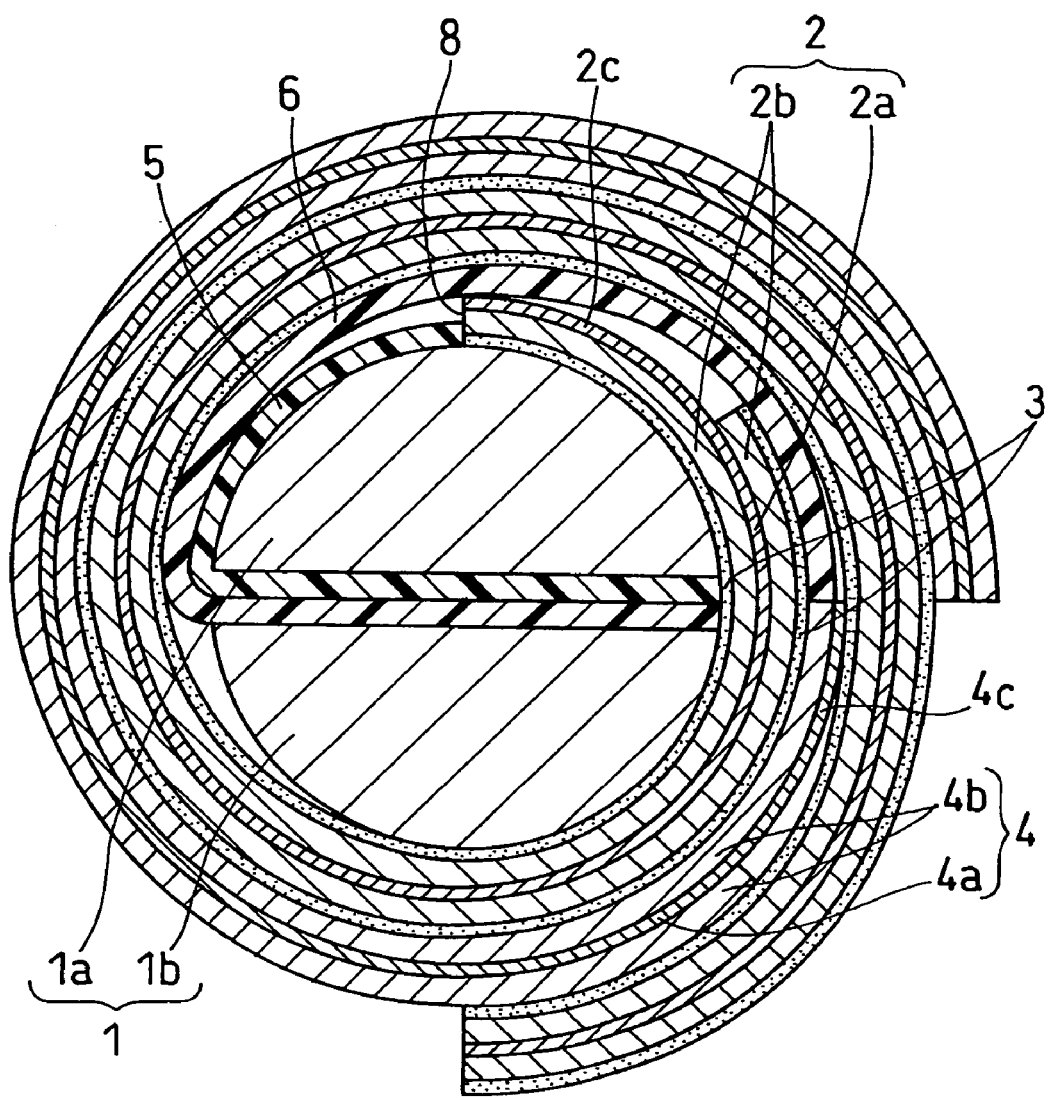
FIG. 2 is a schematic cross-sectional view of an electrode group of a lithium ion secondary battery in another embodiment of the present invention.

The present invention is described below with reference to drawings.

Embodiment 1

FIG. 1 illustrates an electrode group of a lithium ion secondary battery in one embodiment of the present invention.

An electrode group of FIG. 1 includes a winding core 1, a belt-like negative electrode 2, porous films 3, a belt-like positive electrode 4, a negative electrode resin film 5, and a positive electrode resin film 6. In this electrode group, the positions of the inner ends of the negative electrode 2 and the positive electrode 4 (initial winding positions) are different.

The winding core 1 consists of an upper winding core 1a and a lower winding core 1b. The winding core 1 is, for example, cylindrical. The negative electrode 2 comprises a negative electrode core material 2a and negative electrode active material layers 2b formed on both sides of the negative electrode core material 2a. The positive electrode 4 comprises a positive electrode core material 4a and positive electrode active material layers 4b formed on both sides of the positive electrode core material 4a.

The porous films 3, comprising a filler and a binder, are formed on the whole surfaces of the negative electrode active material layers 2b of the negative electrode 2. Since the porous films 3 have the function of insulating the negative electrode 2 from the positive electrode 4, there is no need to provide an independent separator, such as a film, between the positive and negative electrodes. The porous films 3 are bonded to the negative electrode active material layers 2b and are thus integrated into the negative electrode 2. Although the porous films 3 can also be integrated into the positive electrode 4, they are preferably provided on the negative electrode 2 and integrated into the negative electrode 2, because the negative electrode 2 is usually larger in size than the positive electrode 4. Also, the porous films 3 may be provided on both the positive electrode and the negative electrode. This applies to the following Embodiments 2 and 3.

Further, the negative electrode resin film 5 is attached to the end of the negative electrode 2 on the initial winding side, and the positive electrode resin film 6 is attached to the end of the positive electrode 4 on the initial winding side. The negative electrode 2 and the positive electrode 4 are connected to the winding core 1 by the negative electrode resin film 5 and the positive electrode resin film 6, respectively.

The resin films 5 and 6 can be connected to the winding core 1, for example, by sandwiching the end portion of the negative electrode resin film 5 not attached to the negative electrode 2 and the end portion of the positive electrode resin film 6 not attached to the positive electrode 4 between the upper winding core 1a and the lower winding core 1b to fix them to the winding core 1. The upper winding core 1a and the lower winding core 1b are fixed to each other when the electrode plates are wound around the winding core 1.

As described above, according to the present invention, the resin films 5 and 6, not the electrode plates, are positioned near the innermost turn of the electrode group. Therefore, these resin films act as cushions, thereby making it possible to prevent the breakage or separation of the porous film particularly near an inner end 7 of the negative electrode.

Also, since the resin films act as cushions as described above, it is possible to prevent the deformation of the electrode plate on the outer side due to the gap created by the inner end 7 of the negative electrode 2 (the gap corresponding to the thickness of the electrode plate). Accordingly, it becomes possible, for example, to prevent the cracking of the active material layers, which otherwise starts from the above-mentioned gap, at the part of the electrode plate positioned just above the inner end 7, and to prevent the subsequent destruction or separation of the porous films 3 in a more reliable manner. It further becomes possible to reduce the strain exerted on outer parts of the electrode plate relative to the above-mentioned part just above the inner end 7.

It is preferable that the positive electrode resin film 6 be longer than the negative electrode resin film 5. That is, as illustrated in FIG. 1, it is preferable that in a wound state, the positive electrode resin film 6 be positioned between the inner end 7 of the negative electrode 2 and the part of the negative electrode 2 positioned just above the inner end 7. This also applies to the following Embodiments 2 and 3.

The resin films 5 and 6 are preferably made of a material that is stable at the potential of the positive electrode or the potential of the negative electrode. Examples of such material include, for example, polypropylene and polyethylene.

Also, the thickness of each resin film is preferably in the range of 10 μgm to 300 μm. If the thickness of the resin film is less than 10 μm, the resin film does not produce the effect of acting as the cushion.

On the other hand, if the thickness of the resin film is greater than 300 μm, the length of an electrode plate that can be accommodated in a battery case is reduced, so that the battery capacity is lowered. Further, there will be variations in the pressure exerted on the electrode plate due to the deformation of the electrode group, so that charge and discharge reactions do not proceed evenly, thereby resulting in degradation in battery characteristics such as cycle characteristics.

Further, the resin film is preferably porous, like conventional separators and non-woven fabric. When the resin film is porous, its elasticity and flexibility improve. Thus, the ability of the resin film to relax the strain exerted on the electrode plate also improves.

Also, the resin film can be attached to the electrode plate, for example, with tape or by heat bonding.

Also, the positions of the negative electrode and the positive electrode may be reversed in the above-described electrode group.

The positive electrode that can be used is a conventional one known in the art. For example, the positive electrode comprises an active material layer comprising a positive electrode material mixture, and a positive electrode core material that carries the active material layer. Examples of the positive electrode active material include composite oxides, such as lithium cobaltate and lithium nickelate. Examples of the positive electrode core material include one comprising aluminum.

The positive electrode can be produced, for example by applying a positive electrode material mixture, which comprises an active material, a conductive agent and a binder, onto both sides of the positive electrode core material.

An example of the method for producing the positive electrode is given below. A slurry is prepared by mixing 100 parts by weight of lithium cobaltate powder with 3 parts by weight of acetylene black powder serving as the conductive agent and 4 parts by weight of polyvinyliden fluoride resin serving as the binder, and dispersing the resultant mixture in dehydrated N-methyl-2-pyrrolidone (NMP). The slurry is applied onto both sides of a positive electrode core material comprising aluminum foil, dried and rolled, to obtain the positive electrode.

The thickness of the positive electrode core material is preferably 8 μm to 50 μm, and the thickness of the rolled positive electrode active material layer on one side of the core material is preferably 20 μm to 100 μm.

The negative electrode that can be used is a conventional one known in the art. For example, the negative electrode comprises an active material layer containing a negative electrode active material, and a negative electrode core material that carries the active material layer. Examples of the negative electrode active material include carbonaceous materials such as artificial graphite and natural graphite. Examples of the negative electrode core material include one comprising copper.

The negative electrode can be produced, for example by applying a negative electrode material mixture, which comprises a negative electrode active material and a binder, onto both sides of the negative electrode core material.

An example of this production method is given below. A slurry is prepared by mixing 100 parts by weight of artificial graphite powder serving as the negative electrode active material with 1 part by weight of styrene-methacrylic acid-butadiene copolymer (manufactured by ZEON Corporation) and 1 part by weight of carboxymethyl cellulose, and dispersing the resultant mixture in deionized water. The slurry is applied onto both sides of a negative electrode core material comprising copper foil, dried and rolled, to obtain the negative electrode.

The thickness of the negative electrode core material is preferably 5 μm to 50 μm, and the thickness of the rolled negative electrode active material layer on one side of the core material is preferably 20 μm to 150 μm.

The porous films 3 comprise a binder and a filler. The porous films 3 need to be flexible enough to cope with the strain applied to the electrode plate part positioned at the innermost turn of the electrode group. They also need to be resistant to heat such that they are stable with respect to heat applied during the production process of a battery. It is preferable that the porous films 3 contain as the binder a resin that is amorphous, highly heat-resistant, and has rubber elasticity. It is particularly preferable that the porous films 3 contain as the binder a rubber-like polymer including an acrylonitrile unit.

The filler needs to be electrochemically stable in lithium ion batteries, as well as heat-resistant as described above. Further, the filler needs to be a material suitable for forming a slurry in producing the porous film. Thus, an inorganic oxide is most preferable as the filler. Examples of the inorganic oxide include alumina, titania, silica, and zirconia. They may be used alone or in combination of two or more.

The thickness of each porous film is preferably in the range of 20 μm to 30 μm.

It is also possible to use various resin fine particles as the filler.

An example of the method for producing the porous film is given below.

An alumina powder mixture is prepared by mixing 90 parts by weight of an alumina powder having an average particle size of 0.4 μm with 10 parts by weight of an alumina powder having an average particle size of 0.05 μm. 100 parts by weight of this alumina powder mixture is then mixed with 1 part by weight of acrylonitrile-acrylate copolymer rubber particles (BM500B manufactured by ZEON Corporation) and 1 part by weight of polyvinylidene fluoride resin, to form a mixture. This mixture is dispersed in dehydrated N-methyl-2-pyrrolidone, to form a slurry. The slurry is applied onto the negative electrode active material layer and/or positive electrode active material layer by means of a comma roll coater so as to form a film of 20 μm in thickness. Thereafter, it is dried with hot air at 100° C. for about 15 minutes. By performing this series of operations on both sides of the electrode plate, a negative electrode and/or a positive electrode with porous films can be obtained.

As described above, the method for manufacturing a lithium ion secondary battery according to the present invention has the step of forming a porous film, which comprises a filler and a binder, on both surfaces of the negative electrode and/or the positive electrode. Next, the positive electrode resin film and the negative electrode resin film are attached to one end of the negative electrode and one end of the positive electrode, respectively. The resultant positive and negative electrodes are wound together around a winding core, with the resin films fixed to the winding core and without interposing an independent separator between the positive and negative electrodes, to obtain an electrode group.

Since the negative electrode resin film 5 and the positive electrode resin film 6 are highly flexible, they can be easily sandwiched between the upper winding core 1a and the lower winding core 1b. Thus, the negative electrode and the positive electrode can be easily connected to the winding core via the negative electrode resin film 5 and the positive electrode resin film 6, respectively.

Further, since the resin films 5 and 6 are positioned near the innermost turn of the electrode group, the resin films 5 and 6 can reduce the influence of the gap created by the inner end 7 of the negative electrode 2. Accordingly, it becomes possible, for example, to prevent the occurrence of cracking of the electrode plates and the subsequent destruction and separation of the porous films 3, as described above.

Subsequently, the electrode group thus prepared is inserted into a battery can, an electrolyte is injected thereinto, and the opening of the battery can is sealed. In this manner, a cylindrical battery of 18 mm in diameter and 65 mm in height (capacity: 2000 mAh) can be produced.

A combination of a solute and an organic solvent used in lithium ion secondary batteries can be selected as the above-mentioned electrolyte. For example, an electrolyte prepared by dissolving a lithium salt in a mixture solvent of cyclic carbonic ester and chain carbonic ester can be used. One example of such an electrolyte is prepared by adding 4% by weight of vinylene carbonate to a mixture solvent of ethylene carbonate, ethyl methyl carbonate and dimethyl carbonate in a volume ratio of 1:1:1, and dissolving lithium hexafluorophosphate ($LiPF_6$) at a concentration of 1 mole/liter. Other electrolytes than this example can also be used.

Embodiment 2

FIG. 2 illustrates an electrode group of a lithium ion secondary battery in another embodiment of the present invention. In FIG. 2, the same elements as those of FIG. 1 are given the same numbers.

In the electrode group of FIG. 2, the negative electrode 2 has a reduced thickness part 2c from the inner end to which the negative electrode resin film 5 is attached to a predetermined position. Likewise, the positive electrode 4 has a reduced thickness part 4c from the inner end to which the positive electrode resin film 6 is attached to a predetermined position. In the reduced thickness parts 2c and 4c, the active material layer is formed only on the winding core side of the core material. In contrast, in the reduced thickness parts 2c and 4c, the active material layer is not formed on the outer side of the core material, and hence, the core material is exposed.

Because of the provision of the parts 2c and 4c, the thicknesses of the negative electrode 2 and the positive electrode 4 increase stepwise. That is, for example, in the case of the negative electrode 2, the gap created by the inner end 8 becomes about half, compared to the gap created by an electrode plate not having the part 2c. Hence, it becomes possible to prevent the breakage or separation of the porous films near the inner ends of the electrode plates in a more effective manner.

Also, it becomes possible to prevent the occurrence of cracking at the part of the negative electrode 2 positioned just above the inner end 8 and at outer parts thereof, and further prevent the subsequent destruction or separation of the porous films 3.

This also applies to the positive electrode.

Upon winding, the active material layer carried on the winding core side of the core material is greatly affected by the gap created by the inner end of the electrode plate positioned near the innermost turn of the electrode group. Thus, in order to prevent, for example, the breakage of the active material layer on the winding core side of the electrode plate and the porous film formed thereon, the active material layer is preferably formed on the winding core side (inner side) of the core material in the parts 2c and 4c.

Also, in the reduced thickness parts 2c and 4c, an active material layer may be formed on the outer side of the core material such that the thickness of the active material layer gradually increases from the inner end thereof.

Also, the reduced thickness parts may be provided on both the positive electrode and the negative electrode as described above, or they may be formed only on one of the positive electrode and the negative electrode.

Embodiment 3

Figure 3:
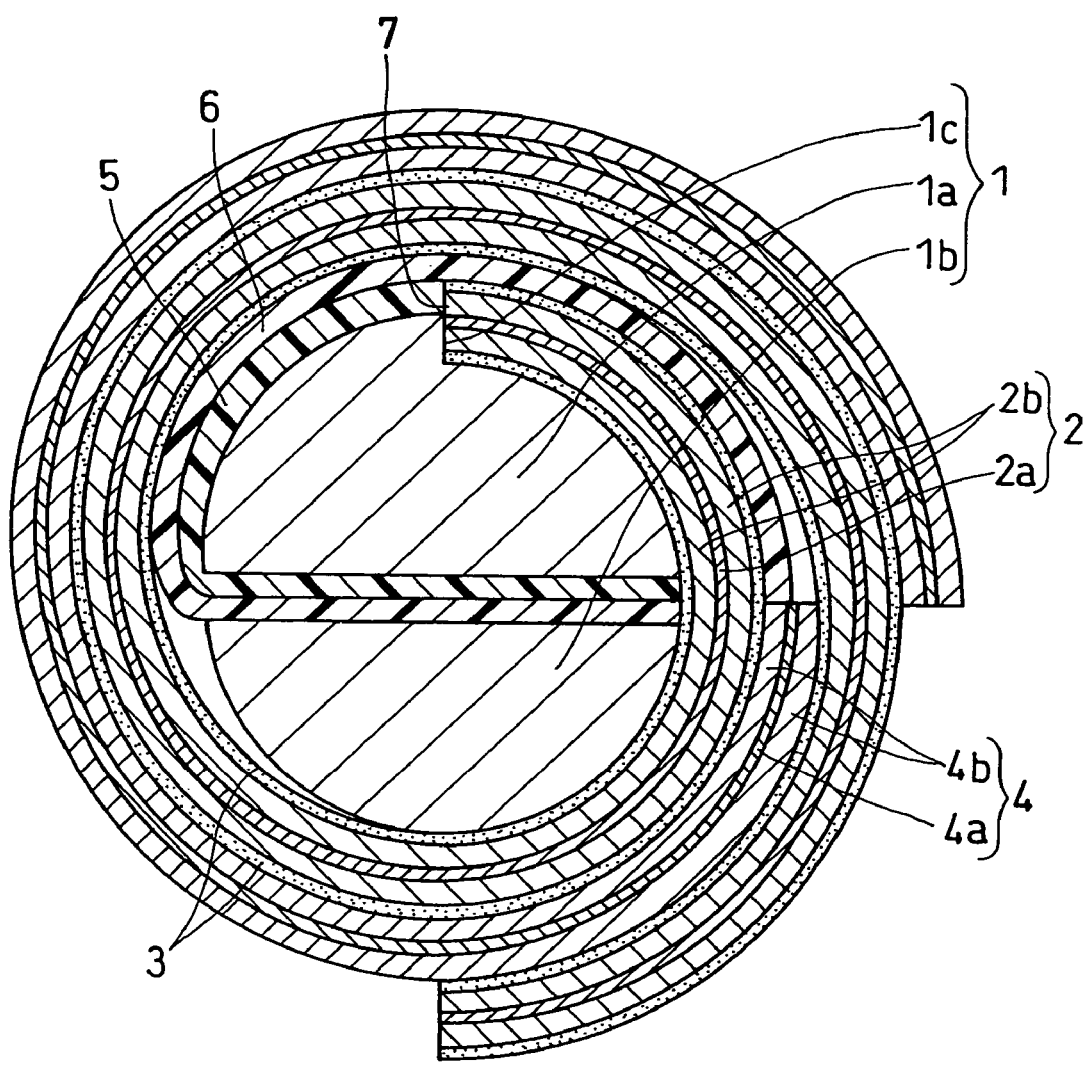
FIG. 3 is a schematic cross-sectional view of an electrode group of a lithium ion secondary battery in still another embodiment of the present invention.
Figure 4:
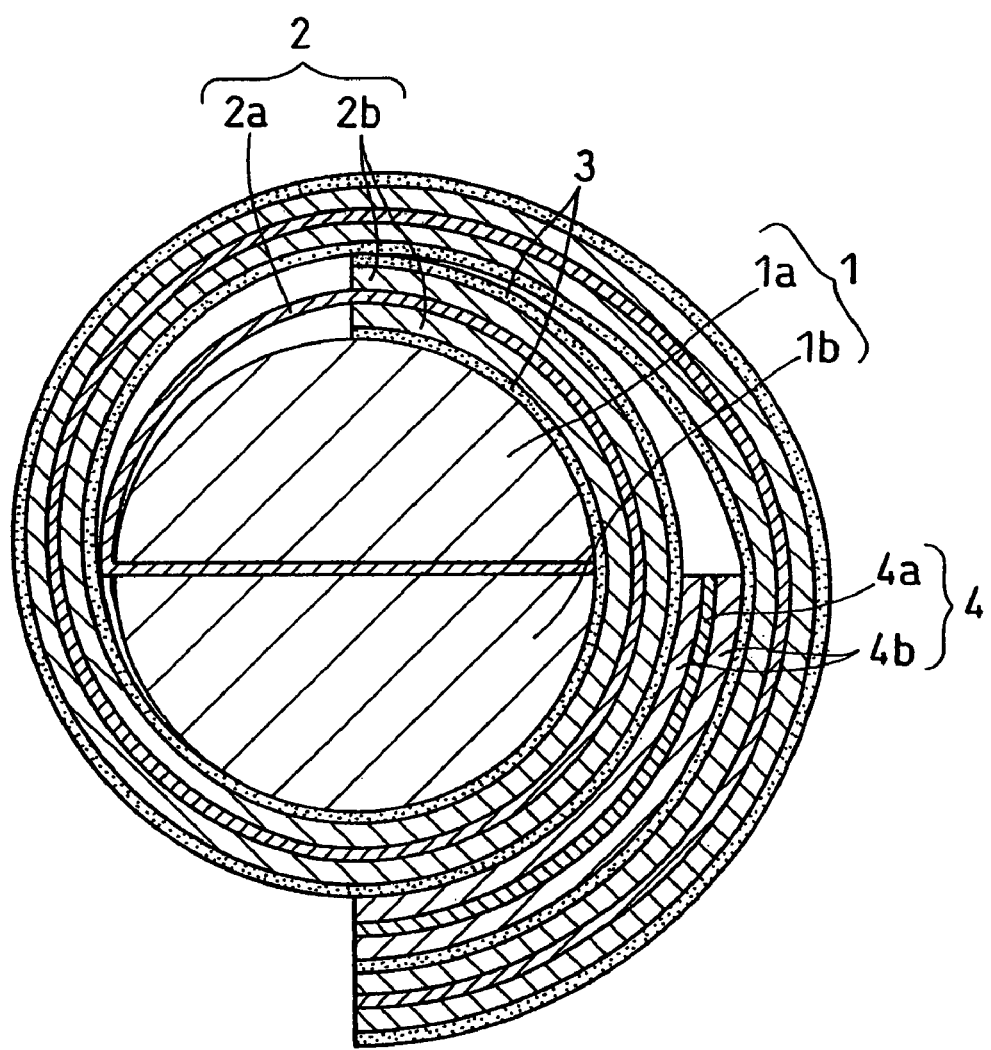
FIG. 4 is a schematic cross-sectional view of an electrode group of a conventional lithium ion secondary battery.

FIG. 3 illustrates an electrode group of a lithium ion secondary battery in still another embodiment of the present invention. In FIG. 3, the same elements as those of FIG. 1 are given the same numbers.

In the electrode group of FIG. 3, the upper winding core 1a of the winding core 1 has a recessed part 1c that corresponds to at least a part of the thickness of the electrode plate. When the inner end of the negative electrode 2 to which the resin film 5 is attached is in contact with the generatrix of a curved surface of the winding core, the recessed part 1c is provided along the generatrix. That is, when the inner end of the belt-like negative electrode 2 on the initial winding side is in contact with the surface of the winding core, the recessed part can be provided such that the winding core is recessed from the part of the winding core which the inner end thereof is in contact with to a predetermined position.

In FIG. 3, the sum of the dimension of the recessed part 1c in radial direction and the thickness of the resin film 5 is equal to the thickness of the negative electrode 2. When the winding core 1 has the recessed part 1c as described above, it becomes possible to eliminate the gap created by the inner end of the negative electrode 2. This effect of eliminating the gap and the above-mentioned cushioning effect of the resin films combine together, making it possible to prevent the breakage or separation of the porous films in a more effective manner.

Also, the dimension of the recessed part 1c may be such that the gap created by the inner end of the electrode plate can be decreased. The dimension is not necessarily such that the gap caused by the inner end of the electrode plate can be eliminated.

In producing such an electrode group, the length of the negative electrode resin film 5 is determined such that the inner end 7 of the negative electrode 2 is positioned at the recessed part 1c of the upper winding core 1a. Also, the length of the positive electrode resin film 6 is determined according to the length of the negative electrode resin film 6.

In the electrode group of the present invention, the winding core is provided with the recessed part as described above, and at the same time, the electrode plates may be provided with a reduced thickness part as described in Embodiment 2.

In this case, in the same manner as the above, the sum of the thickness of the resin film 5 and the dimension of the recessed part 1c in radial direction may be equal to the thickness of the reduced thickness part of the electrode plate.

Further, in this case, the reduced thickness part may be provided on one of the positive electrode and the negative electrode; however, from the viewpoint of reducing the strain exerted on the electrode plates, it is more preferable to provide the reduced thickness part on both the positive electrode and the negative electrode.

Furthermore, in Embodiments 2 and 3, it is also preferable that the thickness of each of the resin films be in the range of 10 to 300 μm in the same manner as in Embodiment 1, and the resin films are preferably porous.

As described above, when a highly flexible resin film is substituted for the exposed part of the core material of the electrode plate located near the innermost turn of a wound electrode group, the resin film acts as a buffer (cushion). Therefore, the strain exerted on the electrode plate is reduced, and the destruction of the porous films is suppressed. Such an electrode group offers excellent safety, since the occurrence of short-circuits or the like is reduced. Consequently, the use of such an electrode group makes it possible to provide a lithium ion secondary battery with a high degree of safety. Such batteries can be used as the power source for portable devices that are required to offer a high degree of safety.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A lithium ion secondary battery comprising an electrode group, said electrode group comprising:
   (1) a winding core;
   (2) a positive electrode and a negative electrode that are wound around said winding core;
   (3) a porous film that is integrally formed on each side of at least one of said positive electrode and said negative electrode;
   (4) a positive electrode resin film whose one end is attached to said positive electrode; and
   (5) a negative electrode resin film whose one end is attached to said negative electrode;
   said electrode group not having an independent separator between said positive electrode and said negative electrode,
   wherein said porous film comprises a filler and a binder, the other end of said positive electrode resin film is connected to said winding core, and the other end of said negative electrode resin film is connected to said winding core.

2. The lithium ion secondary battery in accordance with claim 1, wherein said positive electrode and said negative electrode comprise a core material and an active material layer carried on said core material, said a porous film is integrally formed on each side of said negative electrode, and said active material layer of said positive electrode and/or said negative electrode is carried on only one side of said core material from said inner end of said positive electrode and/or said negative electrode to a predetermined position.

3. The lithium ion secondary battery in accordance with claim 1, wherein one end of said positive electrode or said negative electrode to which said resin film is attached is in contact with the surface of said winding core, and a recessed part is provided at the part of said winding core which said one end of said positive electrode or said negative electrode is in contact with.

4. A method for manufacturing a lithium ion secondary battery comprising the steps of:
   (a) forming a positive electrode active material layer on both sides of a positive electrode core material, to obtain a positive electrode;
   (b) forming a negative electrode active material layer on both sides of a negative electrode core material, to obtain a negative electrode;
   (c) forming a porous film that comprises a filler and a binder on each side of said positive electrode and/or said negative electrode;
   (d) attaching a positive electrode resin film and a negative electrode resin film to one end of said positive electrode and one end of said negative electrode, respectively; and
   (e) winding said positive electrode and said negative electrode around a winding core, with said positive and negative electrode resin films fixed to said winding core, and without interposing an independent separator between the positive and negative electrodes, to form an electrode group.

5. The method for manufacturing a lithium ion secondary battery in accordance with claim 4, wherein said active material layer of at least one of said positive electrode and said negative electrode is formed on only one side of said core material from one end of said core material to a predetermined position.

6. The method for manufacturing a lithium ion secondary battery in accordance with claim 4, wherein a recessed part is provided in said winding core, and said one end of said positive electrode or said negative electrode to which said resin film is attached is fitted to the recessed part.

* * * * *